US008475158B2

(12) United States Patent
Fairy

(10) Patent No.: US 8,475,158 B2
(45) Date of Patent: Jul. 2, 2013

(54) EDGE-GATED NOZZLE

(75) Inventor: Fabrice Fairy, Strasbourg (FR)

(73) Assignee: Mold-Masters (2007) Limited, Georgetown, ON (CA)

(*) Notice: Subject to any disclaimer, the term of this patent is extended or adjusted under 35 U.S.C. 154(b) by 59 days.

(21) Appl. No.: 13/162,345

(22) Filed: Jun. 16, 2011

(65) Prior Publication Data

US 2011/0311676 A1    Dec. 22, 2011

Related U.S. Application Data

(60) Provisional application No. 61/355,503, filed on Jun. 16, 2010.

(51) Int. Cl.
*B29C 45/22* (2006.01)

(52) U.S. Cl.
USPC .................. 425/570; 425/572; 425/573

(58) Field of Classification Search
USPC ............................. 425/570, 572, 573
See application file for complete search history.

(56) References Cited

U.S. PATENT DOCUMENTS

| | | | |
|---|---|---|---|
| 4,184,836 A | 1/1980 | Rees | |
| 4,340,156 A | 7/1982 | Muller | |
| 4,702,689 A | 10/1987 | Schmidt et al. | |
| 4,810,184 A * | 3/1989 | Gellert et al. ............. | 425/548 |
| 4,981,431 A | 1/1991 | Schmidt | |
| 5,009,587 A | 4/1991 | Corvaglia et al. | |
| 5,324,191 A | 6/1994 | Schmidt | |
| 5,326,251 A | 7/1994 | Gellert | |
| 5,366,370 A | 11/1994 | Gellert | |
| 5,820,899 A | 10/1998 | Gellert et al. | |
| 5,980,237 A | 11/1999 | Swenson et al. | |
| 7,172,411 B2 | 2/2007 | Fairy | |
| 7,179,081 B2 | 2/2007 | Sicilia et al. | |
| 7,214,053 B2 | 5/2007 | Schöttli et al. | |
| 7,261,552 B2 | 8/2007 | Gomes et al. | |
| 7,303,384 B2 | 12/2007 | Schreck | |
| 7,306,454 B2 | 12/2007 | Babin et al. | |
| RE40,584 E | 11/2008 | Babin | |

(Continued)

FOREIGN PATENT DOCUMENTS

| | | |
|---|---|---|
| DE | 29902185 U1 | 4/1999 |
| JP | 11320613 A | 11/1999 |
| WO | WO2009/124865 | * 10/2009 |

OTHER PUBLICATIONS

Machine translation of WO2009/124865.*

(Continued)

*Primary Examiner* — Tim Heitbrink
(74) *Attorney, Agent, or Firm* — Medler Ferro PLLC

(57) ABSTRACT

An injection molding system is disclosed that includes a hot runner manifold for providing a melt stream of moldable material to at least one hot runner nozzle that is in fluid communication with one or more mold cavities via at least one injection manifold disposed proximate a downstream end of the nozzle. The at least one injection manifold has a substantially U-shape with at least one mold cavity being disposed between opposing arm segments thereof. Each mold cavity is fed by a pair of nozzle seals, wherein one of the pair of nozzle seals extends inwardly from one of the opposing arm segments while the other of the pair of nozzle seals extends inwardly from the other of the opposing arm segments for directing a melt stream into the mold cavity.

20 Claims, 15 Drawing Sheets

U.S. PATENT DOCUMENTS

| | | |
|---|---|---|
| 7,794,228 B2 | 9/2010 | Catoen |
| 7,845,936 B2 | 12/2010 | Babin |
| 7,850,442 B2 | 12/2010 | Fairy et al. |
| 8,282,387 B2 * | 10/2012 | Braun ........................ 425/549 |
| 2004/0169318 A1 | 9/2004 | Chiba |
| 2006/0082031 A1 | 4/2006 | Dewar |
| 2008/0317898 A1 | 12/2008 | Fairy et al. |

OTHER PUBLICATIONS

Mold-Masters pamphlet entitled "Your Connection! . . . To Injection Molding Excellence: Modular Manifolds", Apr. 1986.*
"HEITEC, 3-D Hot Runner System", No Date, Downloaded from www.heitec.com on May 5, 2010.
"Spacecraft or What?", http://www.technoject.com/company-news, Nov. 22, 2007.

* cited by examiner

EDGE-GATED NOZZLE

CROSS-REFERENCE TO RELATED APPLICATION

This application claims benefit under 35 U.S.C. §119(e) to U.S. Provisional Patent Application No. 61/355,503, filed Jun. 16, 2010, which is incorporated by reference herein in its entirety.

FIELD OF THE INVENTION

The invention relates generally to an injection molding system and, in particular, to an edge-gated nozzle that delivers moldable material to a cavity from substantially opposing sides.

BACKGROUND OF THE INVENTION

Edge gating from a nozzle of an injection molding apparatus through a number of edge gate seals is well known. A multi-cavity edge, or side, gated injection molding apparatus 100 is shown in FIG. 1 that is described in U.S. Pat. No. 5,494,433 to Gellert, issued Feb. 27, 1996, which is incorporated by reference herein in its entirety. Generally, the multi-cavity edge-gated injection molding apparatus 100 includes several nozzles 102, one of which is shown in FIG. 1, that are coupled to a hot runner manifold 118 to receive a melt stream of moldable material therefrom.

Each nozzle 102 is mounted in an opening 104 in a mold plate 106. Nozzle 102 includes a nozzle melt channel 108 for receiving the melt stream from a manifold melt channel 132 and delivering the melt stream to mold cavities 112 via mold gates 110. Nozzle 102 includes a nozzle heater 126 that is monitored and controlled by a thermocouple 128, and manifold 118 includes a manifold heater 130. Nozzle heater 126 and manifold heater 130 are provided to maintain the melt stream of moldable material within melt channels 108, 132, respectively, at a proper processing temperature.

Mold cavities 112 are formed between respective cavity inserts 154 and mold cores 156. Cavity insert 154 is disposed within mold plate 106 and includes seals 150 and cooling channels 152 there between. Each mold core 156 is held in place by a mold insert 158. Mold cavities 112 are uniformly distributed around nozzle 102 with each mold gate 110 extending through a gate insert 114 that is held in position by a gate insert retainer plate 122 and mold insert 158. Each mold gate 110 is aligned with a gate seal 116 that is threadably coupled to a downstream end of nozzle 102. As such, the location of gate seals 116 is generally fixed relative to mold plate 106.

As illustrated in FIG. 1, manifold 118 is a "floating" manifold that is positioned below a back plate 120 and coupled to nozzle 102 such that manifold 118 does not contact mold plate 106. This arrangement allows for thermal expansion of manifold 118 and nozzle 102 in an axial direction. In such an arrangement, requisite axial thermal expansion of manifold 118 is accommodated by having a sliding/telescopic arrangement between manifold 118 and a sprue bushing 124 fixed to back plate 120.

In an alternate configuration in which the manifold is fixed, axial thermal expansion may be accommodated by virtue of a telescoping connection within the nozzle itself, as shown for example in FIG. 2 and described in U.S. Pat. No. 7,179,081 to Sicilia et al., issued Feb. 20, 2007, which is incorporated by reference herein in its entirety. Generally, the edge-gated injection molding apparatus 200 includes a manifold 202 that is located between a mold plate 204, a sprue bushing 206 and a back plate 208. A disk 210 generally restricts movement of manifold 202 relative to mold plate 204 and back plate 208 to axially fix the position of manifold 202. As such during operation, manifold 202 is effectively prevented from flexing in a direction of the back plate due to thermal expansion.

A plurality of nozzles 212 are coupled to the manifold 202. Only one nozzle is shown for simplicity, however, it will be appreciated that in a typical injection molding apparatus a plurality of nozzles are generally connected to a single manifold.

The nozzle 212 is generally comprised of multiple component portions, namely a first nozzle portion 214 and a second nozzle portion 216 disposed in series between the manifold 202 and a mold cavity 218. The first nozzle portion 214 includes a nozzle head 220, which is located adjacent to and axially fixed relative to manifold outlet 222, and a second end 224. The second nozzle portion 216 includes a first end 226, and a second end 228 configured as an edge-gate nozzle. The second end of second nozzle portion 216 is generally axially fixed in a manner as described with reference to FIG. 1.

As nozzle head 220 of first nozzle portion 214 and second end 228 of second nozzle portion 216 are generally fixed, to accommodate axial thermal expansion, first nozzle portion 214 and second nozzle portion 216 are coupled by way of a telescoping connection 230. As shown, telescoping connection 230 is positioned between second end 224 and first end 226 of first nozzle portion 214 and second nozzle portion 216, respectively. In the embodiment shown, the telescoping connection is provided by way of an extension 232 provided on telescoping connection 230, which is in threaded engagement with first nozzle portion 214, that is slidably received in a corresponding bore 234 provided on second nozzle portion 216.

In the art of injection molding, where a mold includes the use of a core to shape an interior surface of a part, there exists a problem known as core shift. This problem occurs when a melt stream of moldable material is injected into a mold cavity containing a slender core, and the injection pressure required to fill the mold cavity causes the core to deflect resulting in molded products with a non-uniform wall thickness. In medical molding applications, such as pipette molding and syringe barrel molding, this uneven wall thickness will result in volumetric discrepancies between molded parts as well as an overall increase in the number of defect parts which do not conform to the tolerance requirements of the end user.

BRIEF SUMMARY OF THE INVENTION

Embodiments hereof are directed toward injection molding systems that include a hot runner injection molding manifold having a melt channel for receiving a melt stream of moldable material from a melt source, and a hot runner injection molding nozzle having a melt channel in fluid communication with the manifold melt channel, the nozzle being disposed within an opening in a mold plate. At least one injection manifold having a melt channel is disposed proximate a downstream end of the nozzle, such that the injection manifold melt channel is in fluid communication with the nozzle melt channel. The at least one injection manifold having a substantially U-shape with a mold cavity disposed between opposing arm segments thereof, wherein at least a pair of nozzle seals extends inwardly from the arm segments to fill the mold cavity.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 2 is a section view of a prior art edge gated injection molding system with a first nozzle portion and a second nozzle portion and a telescopic connection there between.

DETAILED DESCRIPTION OF EMBODIMENTS OF THE PRESENT INVENTION

Specific embodiments of the present invention are now described with reference to the figures. In the following description, "downstream" is used with reference to the direction of mold material flow from an injection unit to a mold cavity of an injection molding system and also to the order of components or features thereof through which the mold material flows from an inlet of the injection molding system to a mold cavity, whereas "upstream" is used with reference to the opposite direction. While specific configurations and arrangements are discussed, it should be understood that this is done for illustrative purposes only. A person skilled in the relevant art will recognize that other configurations and arrangements can be used without departing from the scope of the present invention.

Figure 1:
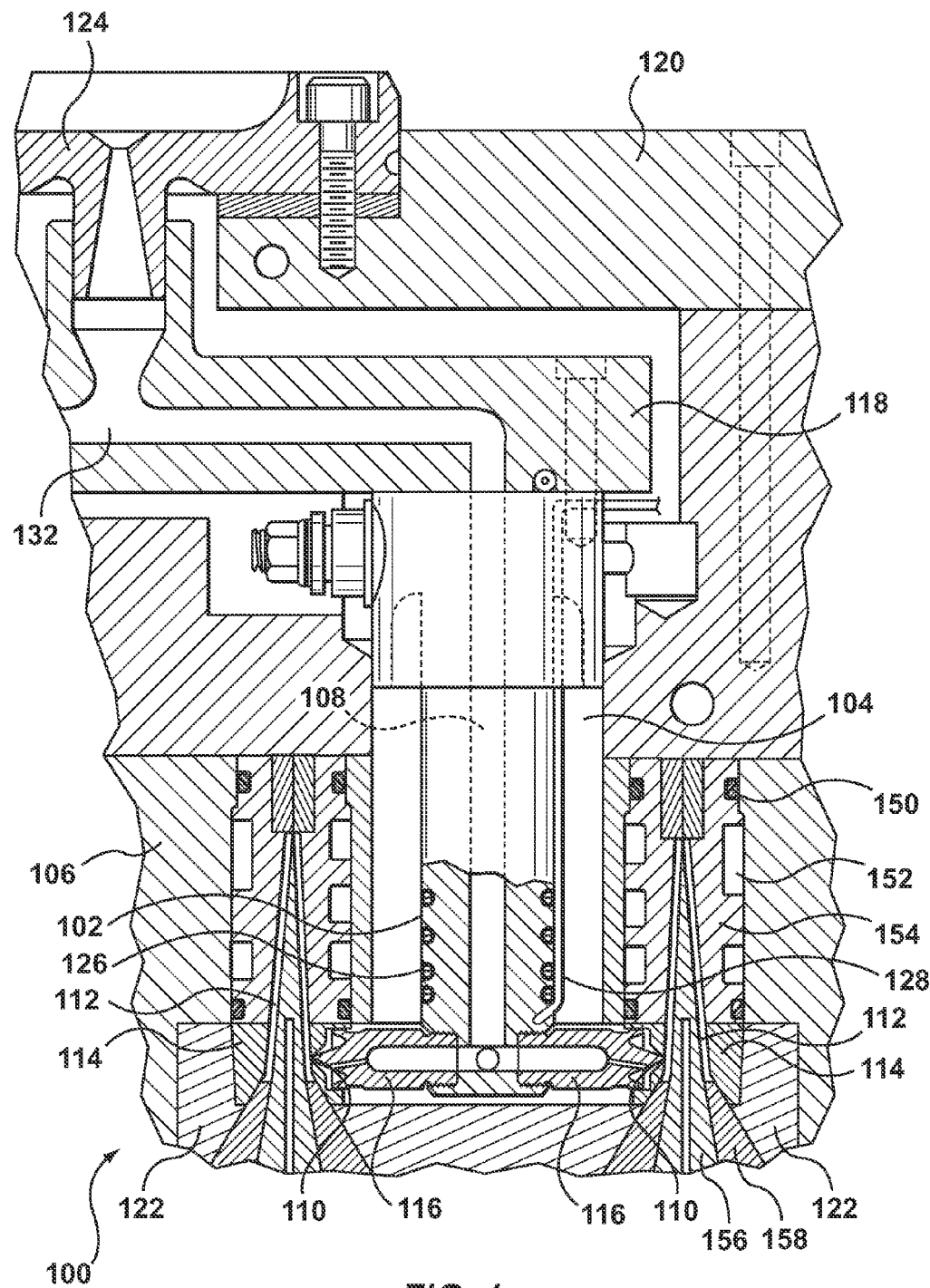
FIG. 1 is a section view of a prior art edge gated injection molding system with a telescoping connection between the sprue bushing and the manifold.
Figure 2:
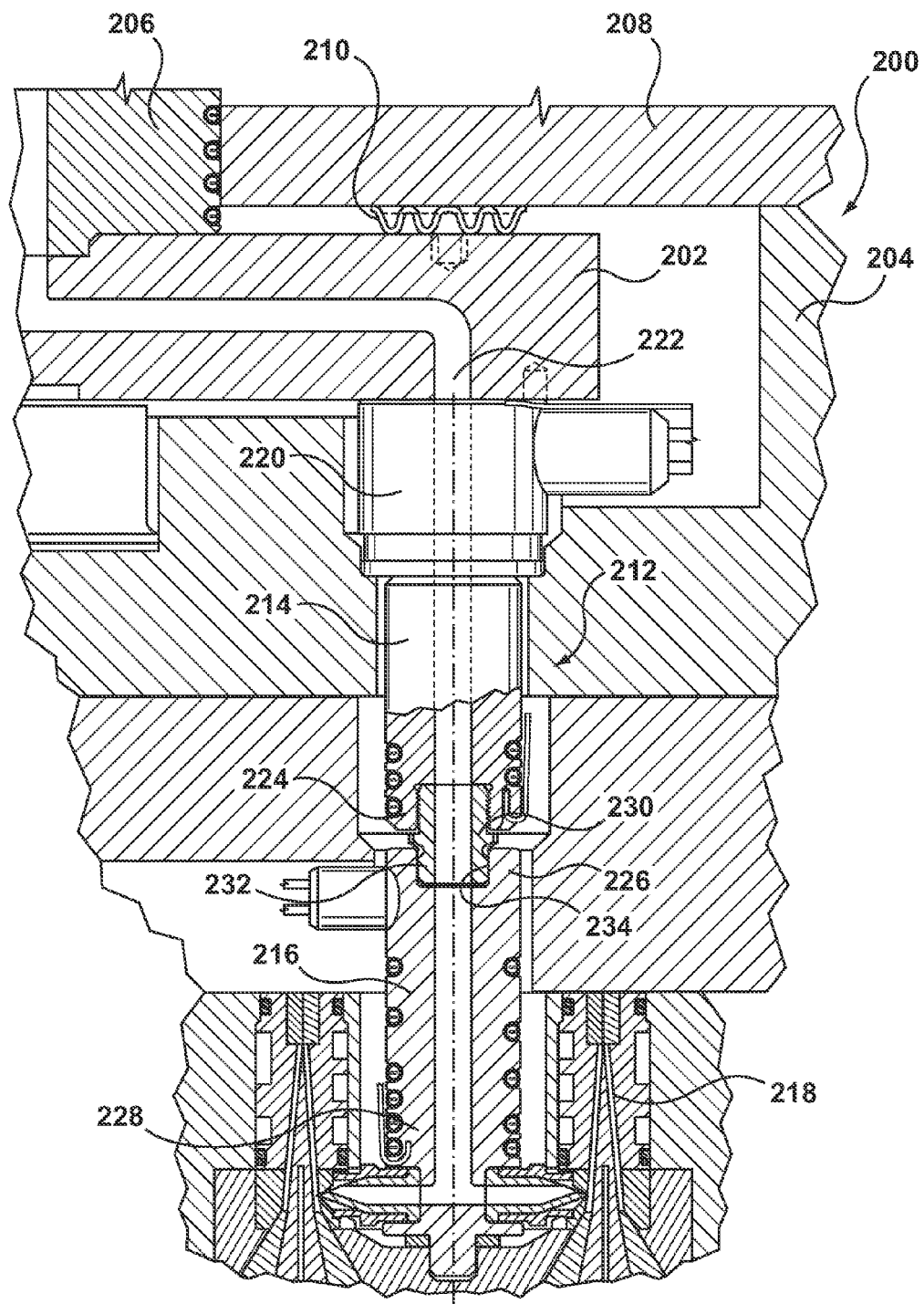
Figure 3:
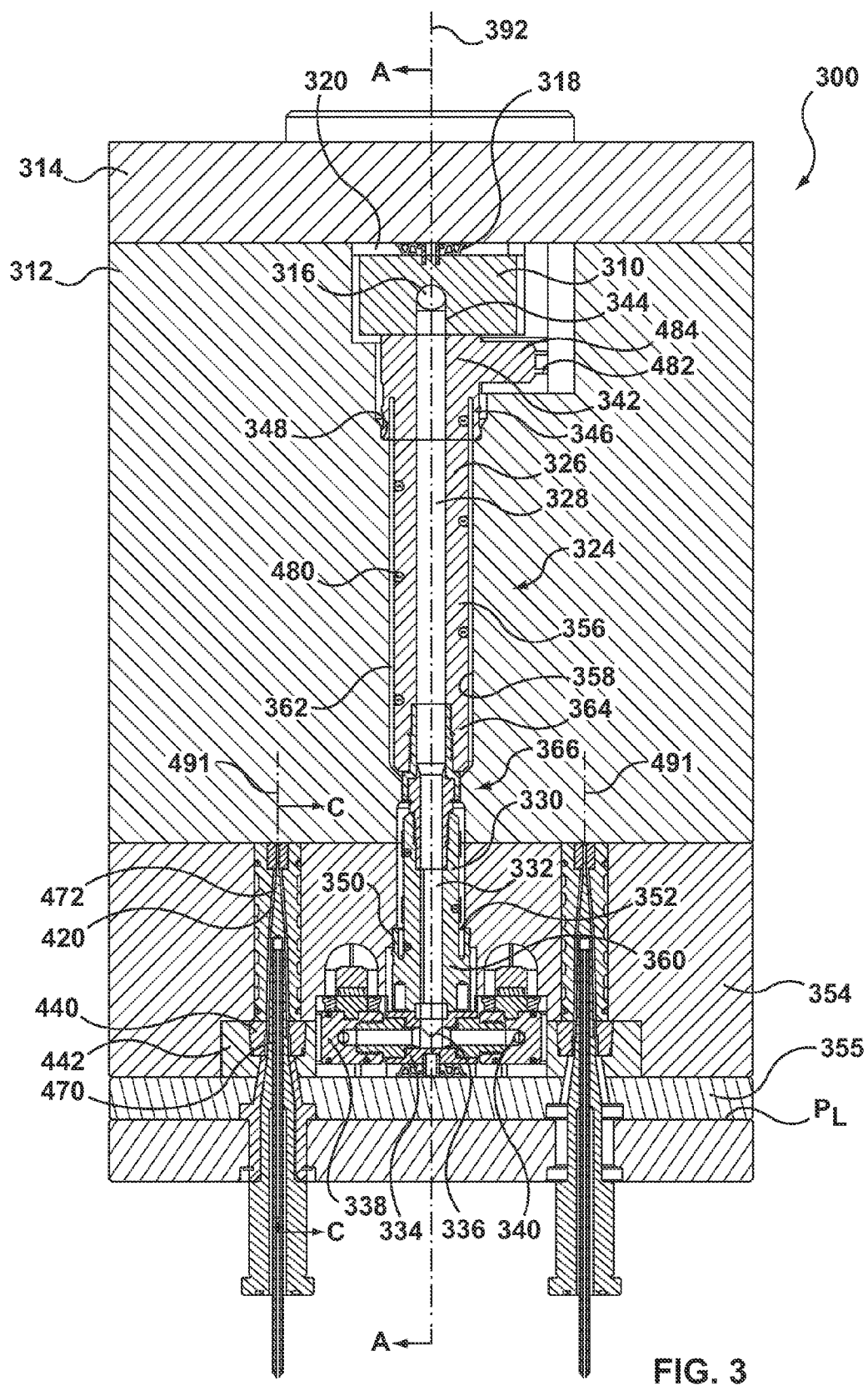
FIG. 3 is a section view of an edge gated hot runner injection molding system in accordance with an embodiment hereof.
Figure 5:
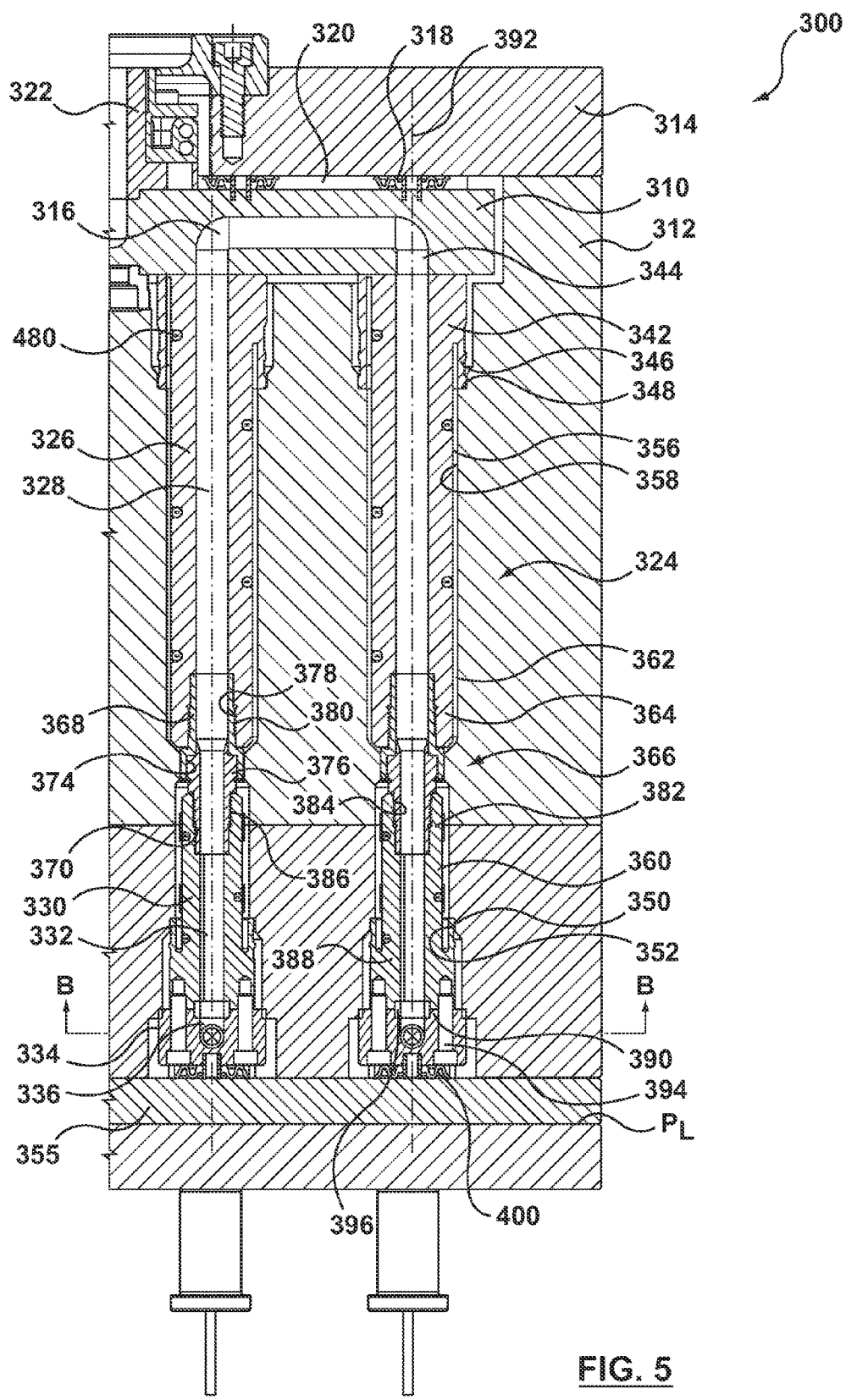
FIG. 5 is a section view of FIG. 3 taken along line A-A.

An edge-gated injection molding apparatus in accordance with an embodiment hereof is illustrated in FIG. 3 and FIG. 5 and is generally indicated by reference numeral 300. Injection molding apparatus 300 includes a hot runner injection molding manifold 310 that is located between a mold plate 312 and a back plate 314. A support disk 318 restricts movement of the manifold 310 relative to the mold plate 312 and back plate 314 to axially fix the position of manifold 310. As such during operation, manifold 310 is effectively prevented from flexing in a direction of the back plate due to thermal expansion. An insulating air gap 320 is provided between the manifold 310 and back plate 314 and mold plate 312. A molding machine nozzle (not shown) delivers a melt stream of moldable material under pressure to a manifold channel 316 of the manifold 310 through sprue bushing 322. The support disk 318 also helps to focus the force from manifold 310 directly over each nozzle 324 to aid in establishing a seal therebetween. Support disk 318 maintains insulating air gap 320 between manifold 310 and back plate 314. Generally support disk 318 is designed to provide minimum contact between manifold 310 and back plate 314 and is capable of flexing to absorb some of the forces therebetween.

A plurality of hot runner injection molding nozzles 324 are coupled to the manifold 310. Each nozzle 324 includes in series a first nozzle portion 326 having a first nozzle melt channel 328, a second nozzle portion 330 having a second nozzle melt channel 332, a melt diverter 334 having a melt diverter melt channel 336 and at least one injection manifold 338 having an injection manifold melt channel 340. Each of the aforementioned melt channels is in fluid communication with respective adjacently positioned melt channels, whereby a continuous melt channel is established through nozzle 324. Although described above as nozzle portions, first and second nozzle portions 326, 330 may be considered nozzles 326, 330 without departing from the scope of the invention. Having regard to each nozzle 324, upstream end 342 of first nozzle portion 326 is configured for alignment between first nozzle melt channel 328 and a respective manifold outlet 344 to receive a melt stream from manifold channel 316. Each first nozzle portion 326 has a flange 346 that sits in a corresponding shoulder 348 of mold plate 312. Flange 346 being held in the corresponding shoulder 348 of the mold plate. During operation, the flange and mold plate shoulder arrangement supports the load from manifold 310 while still allowing the load from manifold 310 to be used as a sealing means/force between nozzle 324 and the manifold 310. Subsequently, second nozzle portion 330 also contains a flange 350 for aligning second nozzle portion 330 within a corresponding bore 352 in a cavity plate 354.

The nozzle bodies 356, 360 of first nozzle portion 326 and second nozzle portion 330, respectively extend through an opening 358, which extends through mold plate 312 and a cavity plate 354. Opening 358 is sized to provide an insulative air gap 362 between nozzle 324 and mold plate 312 and cavity plate 354. Downstream end 364 of first nozzle portion 326 is configured to be coupled to second nozzle portion 330. In the present embodiment, coupling is achieved by way of a telescopic connector 366 to permit relative sliding movement of first and second nozzle portions 326, 330 relative to each other, so as to accommodate axial thermal expansion along longitudinal axis 392. An exemplary arrangement for telescopic connector 366 is represented in FIG. 3 and FIG. 5 (with an enlarged view shown in FIG. 9A), in which an upstream connector component 368 and a downstream connector component 370 are shown. Each of upstream and downstream connector components 368, 370 are attached to respective first and second nozzle portions 326, 330 with upstream and downstream connector components 368, 370 being slidable relative to each other by way of sliding interface 372. While configurable in a variety of ways, sliding interface 372 is shown as upstream connector component 368 providing a stepped bore 374 in which a corresponding stepped extension 376 of downstream connector component 370 is slidingly received. In an embodiment, downstream end 364 of first nozzle portion 326 is provided with a threaded bore 378 to receive a complimentary threaded end 380 of upstream connector component 368. Similarly, an upstream end 382 of second nozzle portion 330 is provided with a threaded bore 384 to receive a complimentary threaded end 386 of downstream connector component. As such, first and second nozzle portions 326, 330 are coupled via telescopic connector 366, whereby first nozzle melt channel 328 is in fluid communication with second nozzle melt channel 332. As such, telescopic connector 366 defines a melt channel to permit the aforementioned fluid communication between melt channels 328, 332 of first and second nozzle portions 326, 330.

Figure 4:
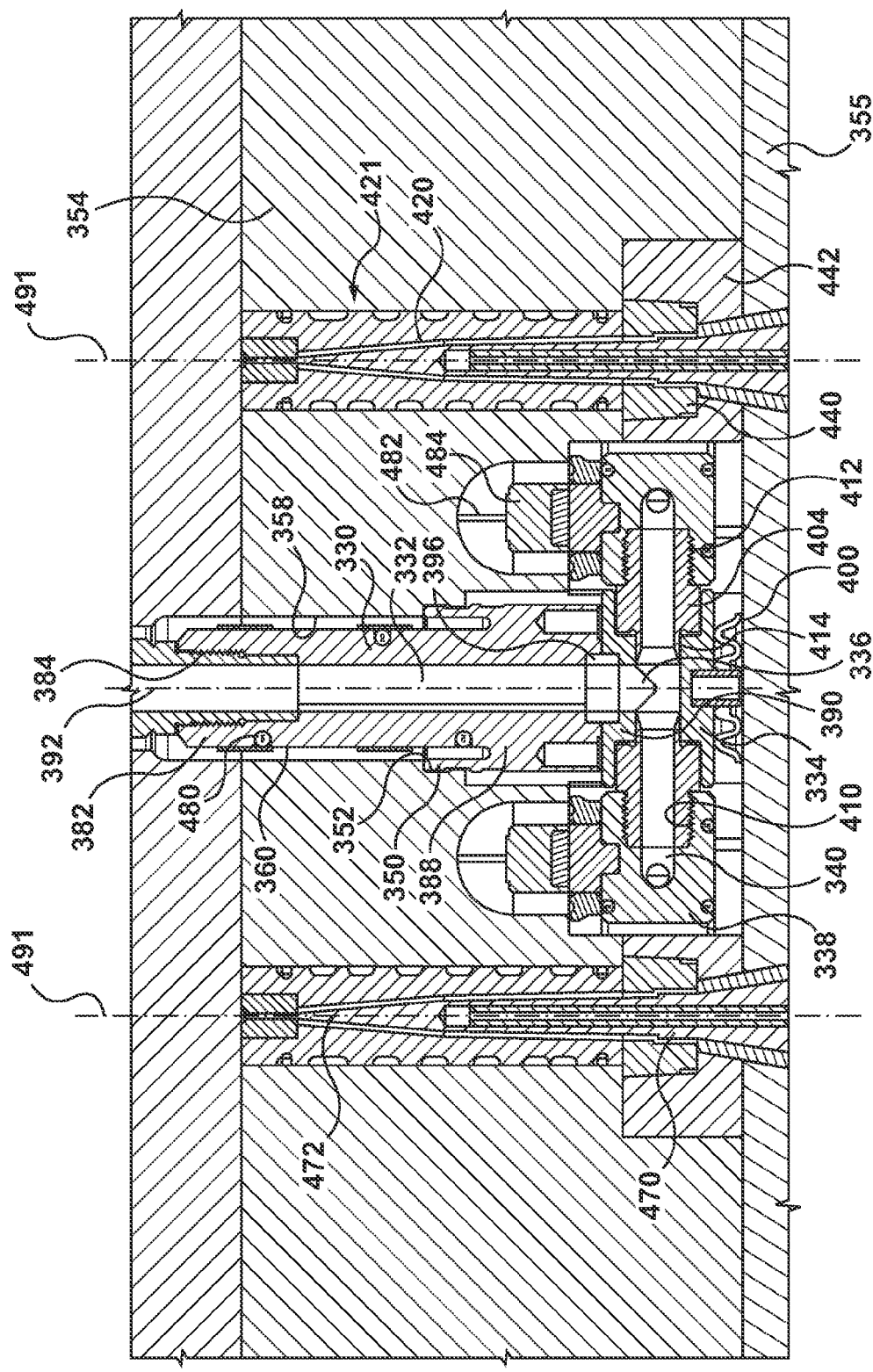
FIG. 4 is an enlarged view detailing a downstream portion of the injection molding system of FIG. 3
Figure 10:
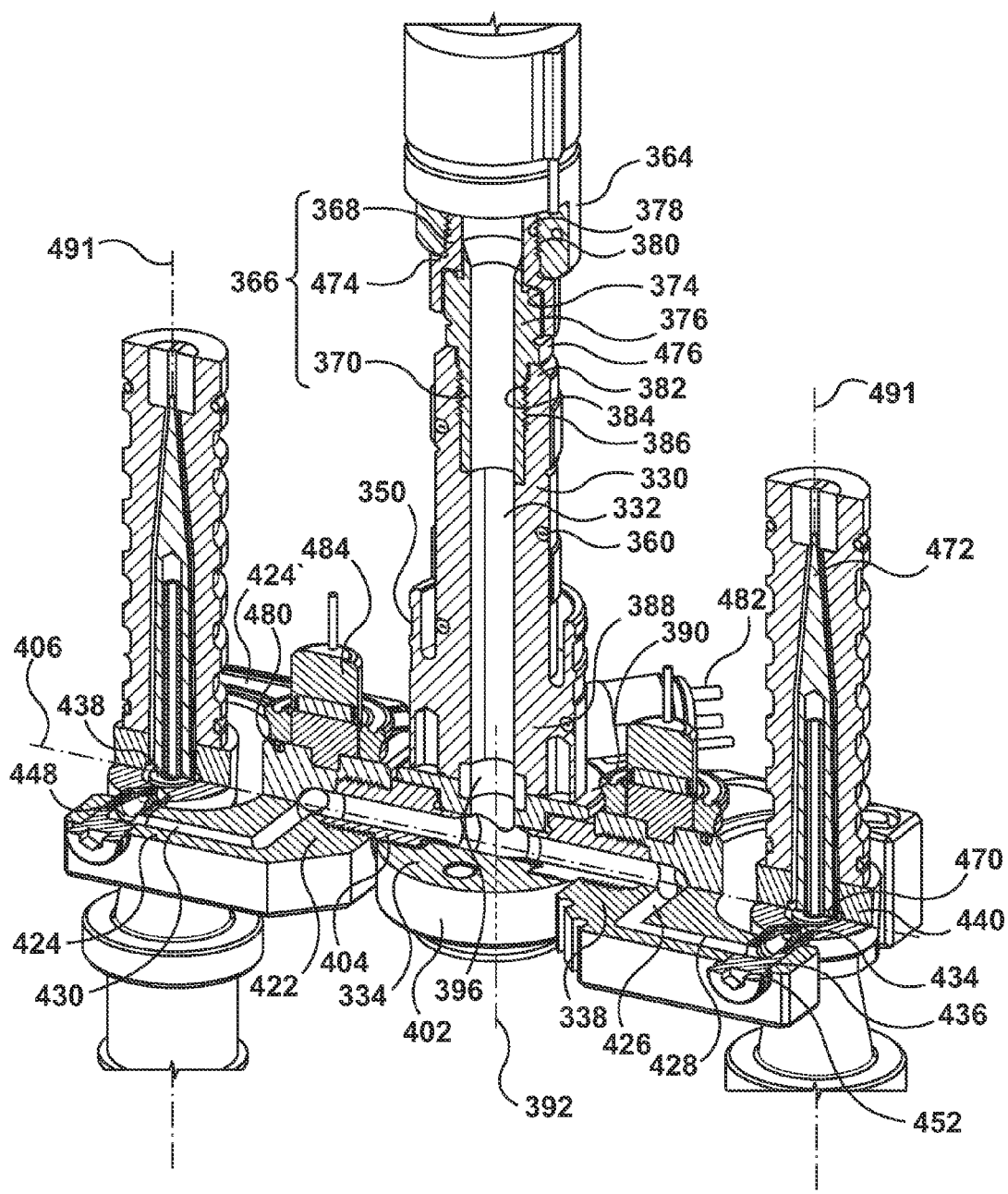
FIG. 10 is an enlarged view of the sectioned portion of the injection molding nozzle depicted in FIG. 8 which shows the second nozzle portion, the melt diverter, and injection manifolds in greater detail.

Referring now to FIG. 4 and FIG. 10, downstream end 388 of second nozzle portion 330 is configured to be coupled to an upstream end 390 of melt diverter 334. Where a telescopic connector is already provided along longitudinal axis 392 to accommodate axial thermal expansion, for example as detailed above with respect to telescopic connector 366 and first and second nozzle portions 326, 330, the coupling between second nozzle portion 330 and melt diverter 334 may be a direct non-telescoping connection. As such, melt diverter 334 may be directly coupled to second nozzle portion 330, for example by direct attachment whereby suitable fasteners 394 (as shown in FIG. 5) are used to releasably attach melt diverter 334 to second nozzle portion 330. In various embodiments, second nozzle portion 330 and melt diverter 334 may be coupled by way of direct threaded connection whereby one of second nozzle portion 330 and melt diverter 334 are configured with a threaded bore, while the other is configured with a complementary threaded end for threaded engagement therebetween. Sealing between second nozzle portion 330 and melt diverter 334 may be further enhanced through the use of an annular seal 396. For example, an annular seal 396 formed of copper alloys; particularly beryllium copper may be implemented. The connection between second nozzle portion 330 and melt diverter 334 may also comprise a telescoping arrangement similar to that described above between first and second nozzle portions 326, 330. While telescopic connector 366 is shown in FIG. 3 as being placed between first and second nozzle portions 326, 330 in some embodiments, the telescopic connector may be positioned between second nozzle portion 330 and melt diverter 334, with a direct non-telescoping connection being used between first and second nozzle portions 326, 330. In some instances, a plurality of telescopic connectors may be used, for example between first and second nozzle portions 326, 330 and between second nozzle portion 330 and melt diverter 334. In each of the embodiments described above, second nozzle portion 330 and melt diverter 334 are coupled, whereby second nozzle melt channel 332 is in fluid communication with melt diverter melt channel 336. It would be understood by one of ordinary skill in the art that regardless of the coupling mechanism used to attach second nozzle portion 330 and melt diverter 334, structures used to achieve this arrangement are configured to permit the aforementioned fluid communication between second nozzle portion 330 and melt diverter 334, for example, a suitable melt channel is provided to interconnect second nozzle portion melt channel 332 and melt diverter melt channel 336.

Melt diverter 334 includes a locator 400 that fixes a position of nozzle 324 relative to cavity retainer plate 355. Melt diverter 334 is additionally configured to couple with at least one injection manifold 338. In the embodiment shown in FIG. 4 and FIG. 6, two injection manifolds 338 are coupled to melt diverter 334 such that each injection manifold 338 radially extends from face 402 of melt diverter 334 on opposing sides of melt diverter 334. Accordingly, in the present embodiment, circumferential face 402 of melt diverter 334 is configured to be coupled to injection manifold 338. "Radially extends" as used herein is meant to convey that injection manifold 338 extends in a direction away from or outward of longitudinal axis 392 of melt diverter 334 in a plane coincident with a radial axis 406 of melt diverter 334. In another embodiment, one or more injection manifolds 338 may be coupled to a downstream surface of melt diverter 334 such that a melt outlet in the downstream surface of melt diverter 334 would be in fluid communication with a respective melt inlet in an upstream surface of a respective injection manifold 338.

Figure 6:
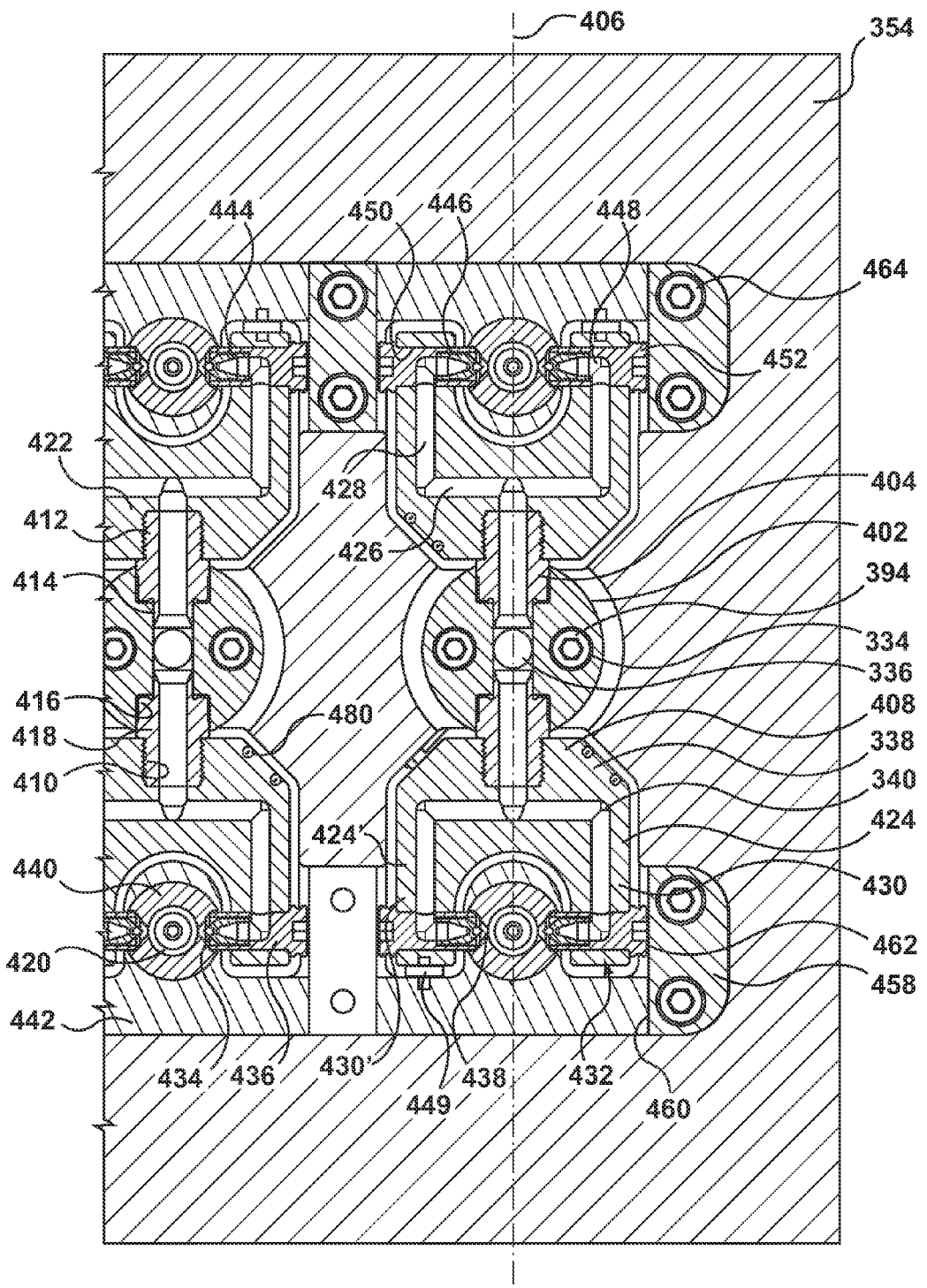
FIG. 6 is a section view of FIG. 5 taken along line B-B.
Figure 9:
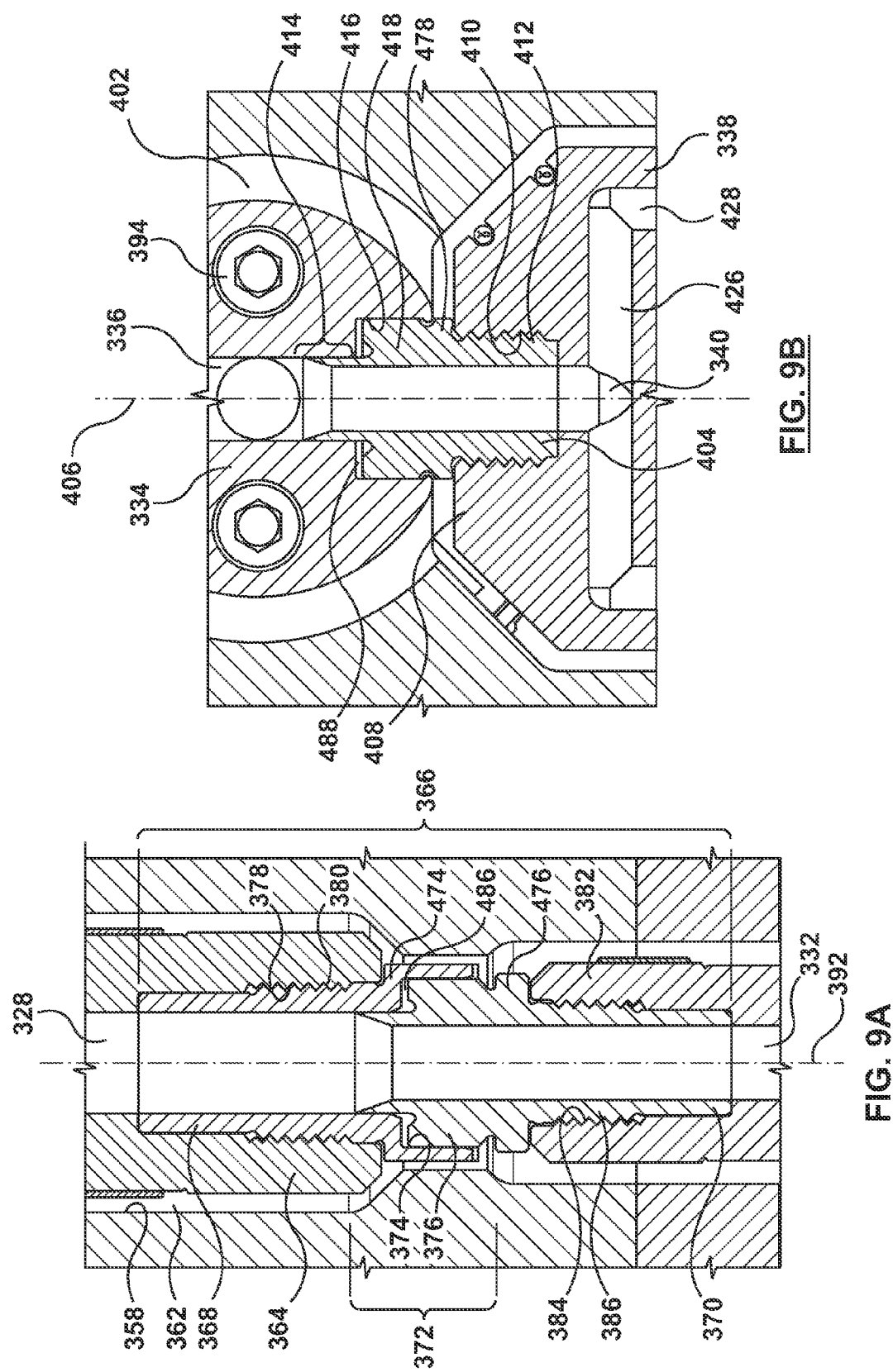
FIG. 9A is an enlarged view of a telescopic connection between the first and second nozzle portions.
FIG. 9B is an enlarged view of a telescopic connection between the melt diverter component and the injection manifold.

The coupling between melt diverter 334 and injection manifold 338 may take on a variety of configurations. In the embodiment shown in FIGS. 4 and 6, coupling is achieved by way of a telescopic connector 404 to permit sliding movement of melt diverter 334 and injection manifold 338 relative to each other, so as to accommodate thermal expansion along radial axis 406 (as shown in FIG. 9B). An exemplary arrangement for telescopic connector 404 is represented in FIG. 4 and FIG. 6, and in enlarged view in FIG. 9B. As shown, upstream end 408 of injection manifold 338 includes a threaded bore 410 configured to receive a complimentary threaded end 412 of telescopic connector 404. As such, telescopic connector 404 remains fixed relative to injection manifold 338, and permits for a sliding relationship with melt diverter 334 at sliding interface 414. While configurable in a variety of ways, sliding interface 414 is shown as melt diverter 334 providing a stepped bore 416 within face 402 in which a corresponding extension 418 of telescopic connector 404 is slidingly received. As such, melt diverter 334 and injection manifold 338 are coupled via telescopic connector 404, whereby melt diverter melt channel 336 is in fluid communication with injection manifold melt channel 340. Appreciably, telescopic connector 404 is provided with at least one melt channel to permit the aforementioned fluid communication between melt diverter 334 and injection manifold 338. In some embodiments, an alternate coupling configuration may be used, for example melt diverter 334 and injection manifold 338 may be directly coupled through threaded engagement therebetween.

With reference to FIGS. 4 and 6, shown are two injection manifolds 338 coupled to melt diverter 334, the injection manifolds 338 being positioned radially and on diametrically opposed sides with respect to melt diverter 334. Once again, for sake of simplifying the foregoing explanation, only one injection manifold 338 will be addressed. As shown, injection manifold 338 is configured with a U-shape profile designed to at least partially encircle a mold cavity 420 having a longitudinal axis 491. In the current embodiment, longitudinal axis 491 of mold cavity 420 is substantially transverse to a radial axis 406 of injection manifold 338. In addition in the current embodiment, a separate mold cavity insert 421 forms mold cavity 420 in cooperation with mold core 470. Injection manifold melt channel 340 generally conforms to this U-shaped profile, and extends from the base segment or region 422 into each arm segment or extension portion 424, 424' of the U-shaped profile on a plane that coincides with radial axis 406. While injection manifold melt channel 340 within each extension portion is shown as comprising primarily two intersecting linear channel sections 426, 428, injection manifold melt channel 340 may comprise a gradual curve connecting the base region 422 to each extension portion 424, 424'.

Figure 11:
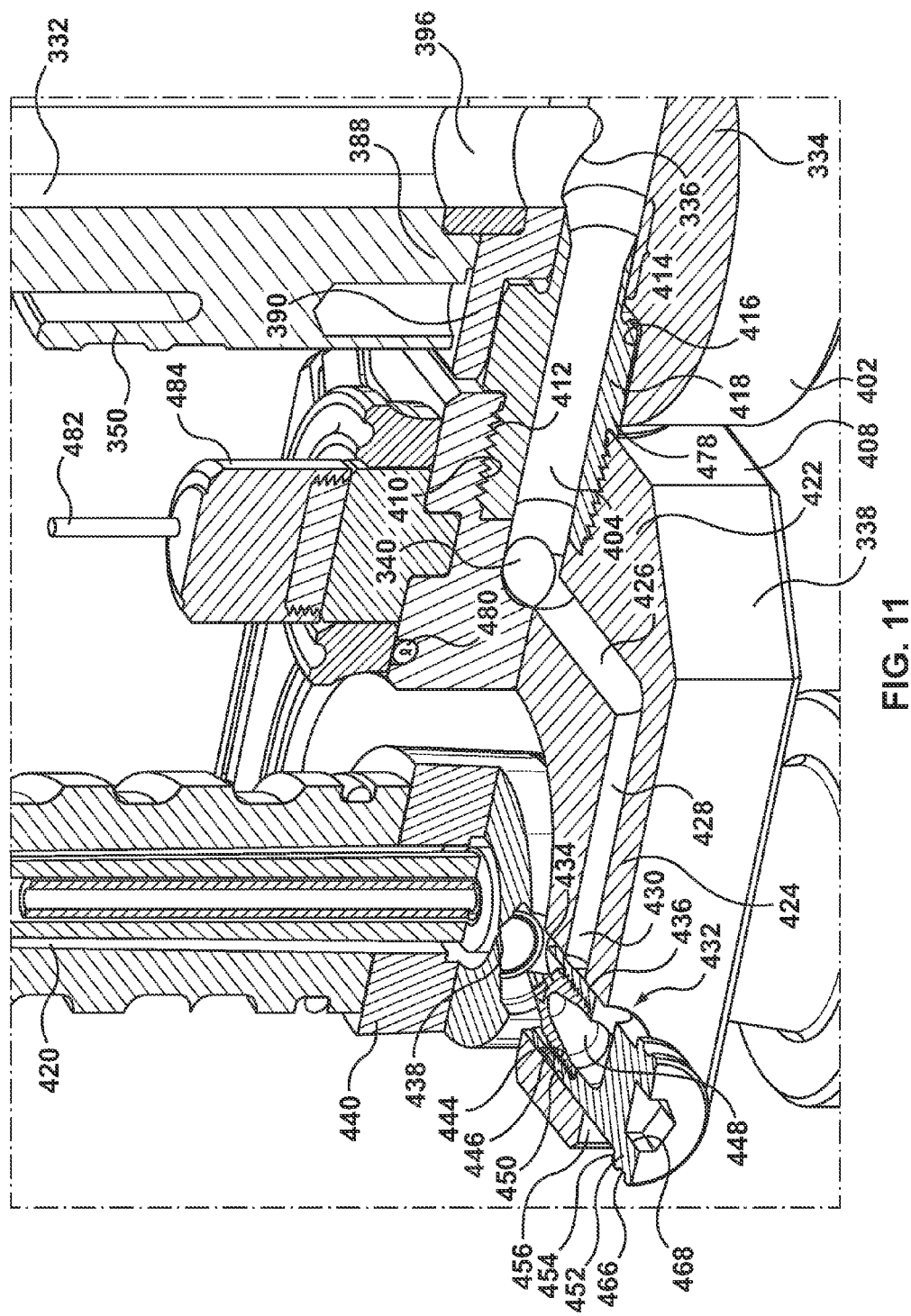
FIG. 11 is an enlarged view of a portion of FIG. 10 depicting the telescopic connection between the melt diverter and injection manifold, as well as the gate region in greater detail.

Each extension portion 424, 424' of injection manifold 338 includes a through bore 450 at a respective downstream end 430, 430' thereof through which is inserted a respective nozzle seal 432, as explained in more detail below with respect to FIG. 7. In the embodiment shown, as there are two extension portions 424, 424' on each injection manifold 338, there are two nozzle seals 432, each generally regarded as a two-piece seal having a nozzle tip 434 and a tip retainer 436 (as shown in FIG. 11; note that for clarity, nozzle seal 432 is shown partially removed). In the embodiment shown, a pair of nozzle tips 434 of injection manifold 338 inwardly extend toward longitudinal axis 491 of a common mold cavity 420 to convey melt from a respective extension portion 424, 424' of injection manifold melt channel 340 to the common mold cavity 420 via a pair of respective mold gates 438 that are uniformly distributed about the mold cavity. In the embodiment shown in FIG. 6, each pair of mold gates 438 is defined by a respective gate insert 440 that is held in position by gate insert retainer 442 such that the pair of nozzle tips 434 extending therein has an edge sealing arrangement. More particularly, a respective tip retainer 436 contacts gate insert 440 to seal against melt leakage around a respective mold gate 438. In the present embodiment, nozzle tip 434 is affixed to tip retainer 436 through threaded engagement. Accordingly, nozzle tip 434 provides a threaded end 444 that is received by tip retainer 436 in threaded bore 446. While exemplified as a two-piece nozzle seal, in alternate embodiments, nozzle seal 432 may be of one-piece construction. It should also be recognized that further alternate configurations for nozzle seal 432 are possible where the nozzle tip is retained by a tip retainer in a manner similar to that shown in co-pending US Patent Application Pub. No. 2009/0269430, the contents of which are hereby incorporated by reference herein. More specifically, a nozzle seal may be configured wherein by virtue of a securing component, for example the brace structure detailed below, the nozzle tip is prevented from separating from the tip retainer. Nozzle seal 432 may be formed from a combination of materials; for example, tip retainer 436 may be comprised of H13 steel and nozzle tip 434 may be comprised of carbide or beryllium copper. The tip retainer and nozzle tip are not intended to be limited to being metallic and therefore, nozzle seal may be comprises of any suitable material combination.

As shown more clearly in FIG. 6, each tip retainer 436 is configured to receive melt from a respective upstream section of the injection manifold melt channel 340 and redirect the melt to a respective mold gate 438. As such, each tip retainer 436 includes a nozzle seal melt channel 448 which suitably redirects the melt toward mold cavity 420 and in this manner may be considered to function as a manifold plug. In the embodiment shown, nozzle seal melt channel 448 includes a 90° turn, but as will be appreciated, other angular configurations are possible, depending on the extent of redirection of melt that is required. In an alternate embodiment, injection manifold 338 may be a two-piece brazed manifold such that melt channel 448 is formed within one or both of the parting surfaces of the brazed manifold thereby eliminating the need for a bore extending through a respective extension portion 424, 424' for accommodating tip retainer 436. In such an embodiment, a respective nozzle tip 434 may be directly attached to a respective interior side wall of injection manifold 338 by, for e.g., threaded engagement, and may seal against a respective mold gate via a face sealing arrangement.

In some embodiments, injection manifold 338 is maintained relatively fixed in relation to gate insert retainer 442, for example through the use of a suitable locator 449 situated on at least one of downstream end 430, 430'. Locator 449 is not intended to be limited to any one configuration. In the embodiment shown in FIG. 6, locator 449 is provided as a dowel having a central flange, wherein projections from the dowel are received in corresponding recesses of injection manifold 338 and gate insert retainer 442. In this way, by virtue of the flange, injection manifold 338 cannot grow towards gate insert retainer 442. Accordingly, thermal expansion is directed along radial axis 406 towards telescoping connector 404 between injection manifold 338 and melt diverter 334. As such, no undue pressure is exerted upon nozzle seals 432 during heating of nozzle 324. While injection manifold 338 is represented as having one locator 449, it will be appreciated that each extension portion 424, 424' of an injection manifold 338 may be provided with locator 449.

Figure 7:
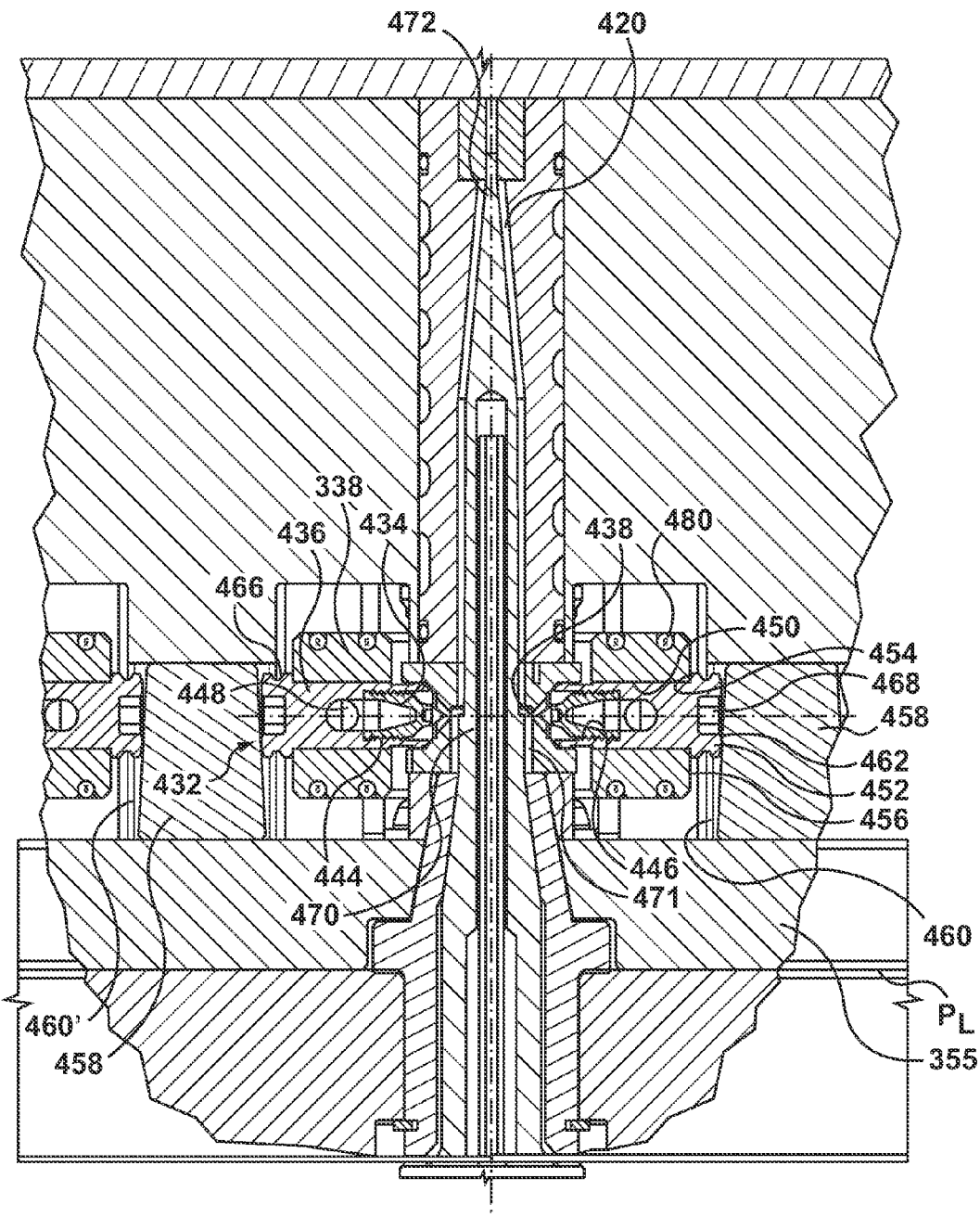
FIG. 7 is an enlarged section view of FIG. 3 taken along line C-C.

Referring now to FIG. 7, to retain nozzle seals 432 in position on each respective extension portion 424, 424' of injection manifold 338, each nozzle seal 432 is configured to seat within corresponding bore 450, whereby each nozzle seal 432 is inserted from an outward surface of the U-shaped profile, directed inwardly such that nozzle tips 434 extend toward longitudinal axis 491 of a respective mold cavity 420. Accordingly, nozzle seal 432 is provided with a shoulder 452 which engages a corresponding shoulder abutment surface 454 on an outside surface 456 of injection manifold 338. To reduce the likelihood of rotation of nozzle seal 432 in bore 450, a suitable anti-rotation device, such as a dowel may be used. Alternately, nozzle seal 432 may include a keyed surface that corresponds with a matching keyed surface on corresponding bore 450. In the embodiment shown, to hold the nozzle seal 432 in place within injection manifold 338, a brace 458 is implemented. Accordingly, as shown in FIG. 7 once nozzle seal 432 is seated within corresponding bore 450, a surface 460 of brace 458 contacts an outside face 462 of nozzle seal 432 so as to ensure engagement between and abutment surface 454 of shoulder 452 of nozzle seal 432, and outside surface 456 of injection manifold 338. Regarding geometry, surface 460 of brace 458 is an angled surface that contacts the likewise angled outside face 462 of nozzle seal 432. In other embodiments, surface 460 and outside face 462 are not angled. To retain brace 458 in place, at least one suitable fastener 464 (e.g. bolts) threadably engages cavity plate 354. Subsequently, attached thereto is cavity retainer plate 355.

In addition to merely contacting an outside face 462 of nozzle seal 432, brace 458 may be dimensioned to provide a preload upon nozzle seals 432, so as increase the sealing force at abutment surface 454 and outside surface 456 of injection manifold 338.

While brace 458 is shown as having surface 460 for engaging outside face 462 of nozzle seal 432, brace 458 may comprise an additional surface 460' for engaging an adjacently positioned nozzle seal 432 of a separate adjacent nozzle 324 (e.g. first and second nozzle portions, and associated melt diverter and injection manifold) as shown, for example in FIG. 7.

As nozzle seals 432 are retained in position by brace 458, their removal is simplified. Given the proximity of brace 458 relative to the parting line $P_L$, removal of nozzle seals 432 simply requires the removal of cavity retainer plate 355 and brace 458, followed by the removal of nozzle seals 432 from injection manifold 338. A groove 466 in the diameter of shoulder 452 and/or a threaded blind bore 468 in outside surface 456 of nozzle seal 432 assist in the removal of nozzle seal 432. Accordingly, the pitch between nozzles 324 will be sized to allow for disengagement clearance of nozzle seals 432 relative to an adjacent nozzle 324.

By virtue of the U-shaped profile of injection manifold 338, and the inwardly directed nozzle seals, it is possible to convey melt to cavity 420 from a single nozzle 324, as opposed to two or more nozzles. As such, a malfunction in any one nozzle 324, for example as a result of a heater malfunction does not affect the injection molding process of any other nozzle 324 extending from manifold 310. In addition, by delivering the melt to substantially opposing sides of a single cavity, the melt enters the cavity in a more balanced manner, thereby improving overall part quality. For example, the balanced flow may reduce the incidence of weld lines, and the weaknesses associated therewith. Of particular significance is the ability for this balanced delivery to address the longstanding issue of core shift or deflection arising from imbalanced melt flow. By delivering the melt from substantially opposing sides, the core is not subject to deflection forces arising from pressures attributable to melt substantially filling one side prior to the other. Core deflection is further reduced by introducing this balanced melt flow within cavity 420 at mold gates 438 positioned in closer proximity to a broader base portion 471 of the core 470, as opposed to areas in proximity to a narrower portion 472, which in many instances is a weaker section of the core 470.

In various embodiments hereof, telescopic connectors 366, 404 or more broadly any suitable connector for connecting the various nozzle components may be formed from a material having good thermal conductivity for e.g. copper alloys, particularly beryllium copper alloys, certain grades of steel and stainless steel, and/or may be formed from a material having good wear and corrosion resistance as would be beneficial in certain applications. Where a telescopic connector is comprised of more than one component, such as telescopic connector 366, at least one of the components, that is one of upstream and downstream connector components 368, 370 may be formed of a different material than the other. The choice of materials may also take into account the extent of expansion of the telescoping connector within the respective nozzle portions to provide additional sealing action. The telescopic connector may also include radial projections that may be gripped for engaging the connector during installation. For example, with respect to telescopic connector 366, at least one of upstream and downstream connector components 368, 370 may include radial projections 474, 476 (as shown in FIG. 9A) to assist during installation into respective first and second nozzle portions 326, 330. Similarly, telescopic connector 404 may include radial projection 478 (as shown in FIG. 9B) to assist during installation into injection manifold 338. Where provided, the radial projection provided on a telescopic connector 404 or components 368, 370 of a telescopic connector 366 may act as a step to prevent over tightening of the telescopic connectors within respective threaded bores. In the embodiment shown, radial projections 474, 476, 478 are in the form of a hex for engaging a wrench or other suitable tool during installation or removal. It will also be appreciated that the orientation of the telescoping connectors or the components making up the telescoping connector may be reversed in certain instances. In other words, there is no intent to be limited to solely the orientation exemplified in the figures, as other orientations of the telescoping connectors may be suitably implemented. In addition, the telescoping connections may be integral with the nozzle components. For example, first nozzle portion 326 may include a projection that is slidably received in a corresponding bore in second nozzle portion 330, such as the arrangement of the telescoping connection shown in FIG. 4 of U.S. Pat. No. 7,252,498, the contents of which are herein incorporated by reference.

Nozzle component heaters 480 are used in injection molding apparatus 300 to provide heat thereto for maintaining the components of nozzle 324 at a required processing temperature. With respect to nozzle 324, nozzle heaters 480 may be used with at least one of first nozzle portion 326, second nozzle portion 330, melt diverter 334 and injection manifold 338. Nozzle component heaters 480 are in communication with a power source (not shown) through wires 482 emanating from a respective terminal end 484. The heaters may be controlled independently, or as a group depending on the application. An exemplary heater would include a wire element heater which may be embedded within or simply wrapped around the nozzle. Other exemplary heaters would include a band or cartridge heater where suitable. In certain applications, nozzle 324 may include at least one thermocouple operably coupled thereto to monitor the operating temperature and regulate operation of the one or more heaters to achieve the desired operating parameters.

In the various embodiments exemplified above, nozzle 324 has comprised first nozzle portion 326, second nozzle portion 330, melt diverter 334 and injection manifold 338. It will be appreciated that first and second nozzle portions 326, 330 may be combined into a single nozzle structure, and is further not intended to be limited to any particular length, proportion or configuration as may be shown in the drawings. Where first and second nozzle portions 326, 330 are combined, the telescopic arrangement between nozzle components to accommodate axial thermal expansion would be incorporated at the coupling between the combined nozzle portion and melt diverter 334. It will be further appreciated that in some embodiments, second nozzle portion 330 and melt diverter 334 may be formed as a single piece, whereby the telescopic arrangement would generally be positioned between first and second nozzle portions 326, 330 as described above. In some embodiments, first nozzle portion 326, second nozzle portion 330 and melt diverter 334 may be formed on one piece. In this arrangement, to accommodate for thermal expansion, a telescopic arrangement may be implemented where nozzle 324 couples to the manifold, for example by way of a telescopic connector as described in U.S. Pat. No. 7,614,869, the contents of which are hereby incorporated by reference herein.

Although indicated as radially extending from melt diverter 334, the coupling of injection manifold 338 to melt diverter 334 is not intended to be limited to just one orientation. Other orientations may also be implemented whereby injection manifold 338 extends at an angle relative to a plane generally defined by the body of melt diverter 334 or may extend from melt diverter 334 in a plane parallel to, but offset from a radial axis of the melt diverter 334 extending from longitudinal axis 392.

Where a telescopic connector is provided, in cold conditions, the telescopic connector is sized to provide a gap 486 that permits for thermal expansion. For example, as shown in FIG. 9A with respect to telescopic connector 366, gap 486 is provided between upstream and downstream connector components 368, 370, while in telescopic connector 404 shown in FIG. 9B, a gap 488 is provided in the vicinity of the sliding interface 414 at melt diverter 334. In operating conditions with the high temperatures thereof, the aforementioned gaps, that is gaps 486, 488 of the telescopic connectors is reduced or even consumed by the thermal expansion of the nozzle components.

In operation, injection molding apparatus 300 is heated to an operating temperature, which causes the components including manifold 310 and the various nozzle components to expand. Manifold 310 is relatively fixed in position on one surface by the interaction between support disk 318 and back plate 314 and on the other surface by first nozzle portion 326, more particularly by the interaction between flange 346 of first nozzle portion 326 and shoulder 348 of mold plate 312. Nozzle seals 432 of injection manifold 338 are also relatively fixed in position with respect to mold gates 438. As such, the thermal expansion of the system is accommodated by the interaction of telescopic connector 366 between first and second nozzle portions 326, 330, and telescopic connectors 404 between melt diverter 334 and each respective injection manifold 338.

A melt stream of moldable material is delivered under pressure from a machine nozzle (not shown) to manifold channel 316 of manifold 310. The melt is distributed from manifold channel 316 to at least one nozzle 324. The melt flows through the series of melt channels within nozzle 324, namely first nozzle melt channel 328, second nozzle melt channel 332, melt diverter melt channel 336 and injection manifold melt channel 340, through nozzle seals 432, through mold gates 438 and into respective mold cavities 420. For any one injection manifold 338 associated with a nozzle 324, at least a pair of nozzle seals are directed inwardly toward each other to convey melt to the same mold cavity through respective mold gates that are disposed on substantially opposing sides of the mold cavity, thereby promoting a more balanced fill of the cavity and where present, reducing the extent of core shift. Once the injection portion of the cycle is complete, the molded parts are cooled and ejected from the mold cavities.

Figure 8:
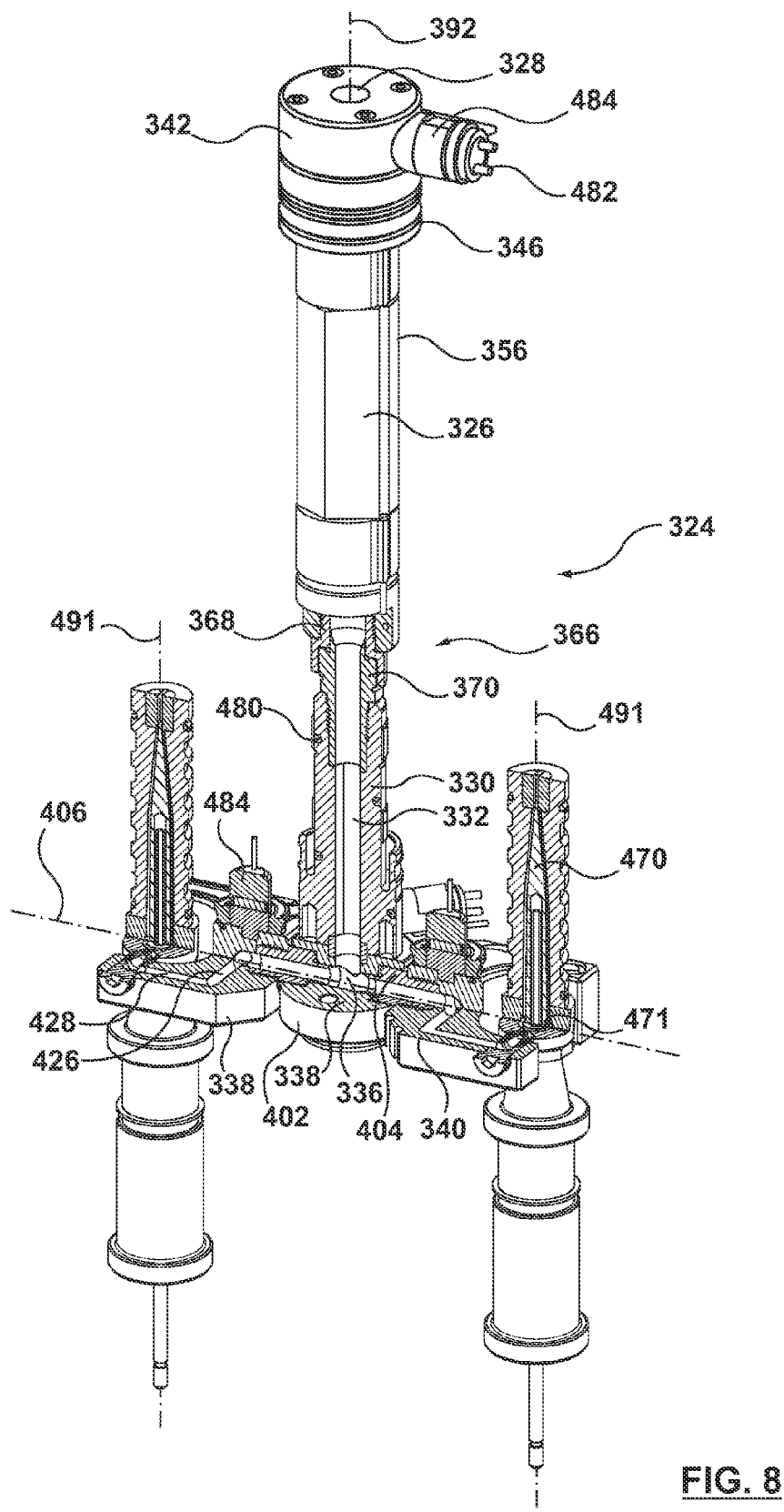
FIG. 8 is a partially sectioned perspective view of an edge gating injection molding nozzle according to an embodiment hereof showing the relationship between the nozzle components and the mold core and cavity.
Figure 12:
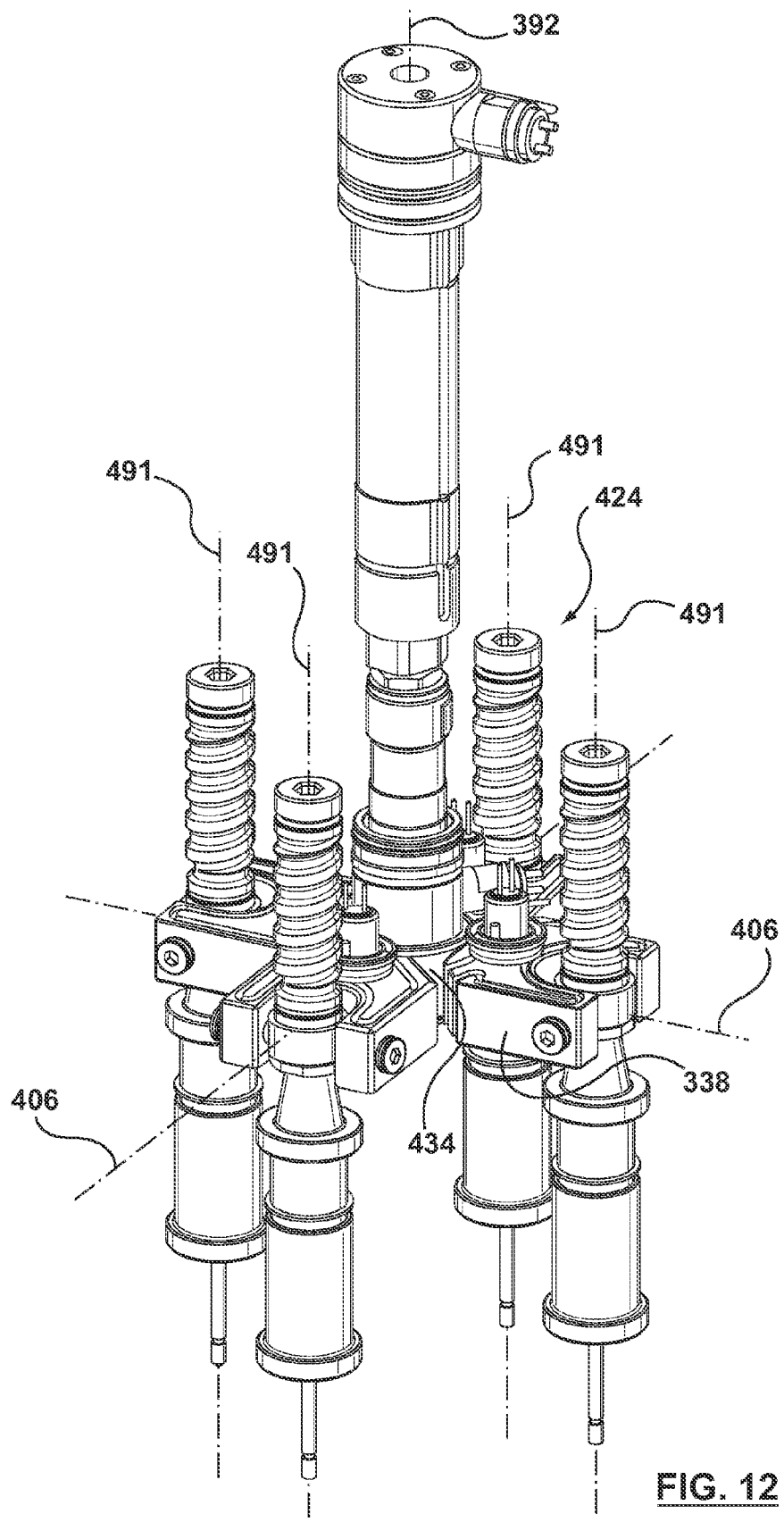
FIG. 12 is a perspective view of an edge gating injection molding nozzle according to another embodiment hereof showing the relationship between the nozzle components and the mold core and cavity.

While nozzle 324 has been exemplified above as having a melt diverter 334 coupled to two injection manifolds 338, for example as shown in FIG. 8, alternate arrangements of the nozzle are contemplated. For example, in the arrangement shown in FIG. 12, provided is nozzle 424 having a melt diverter 434 configured to couple with four injection manifolds 338.

Figure 13:
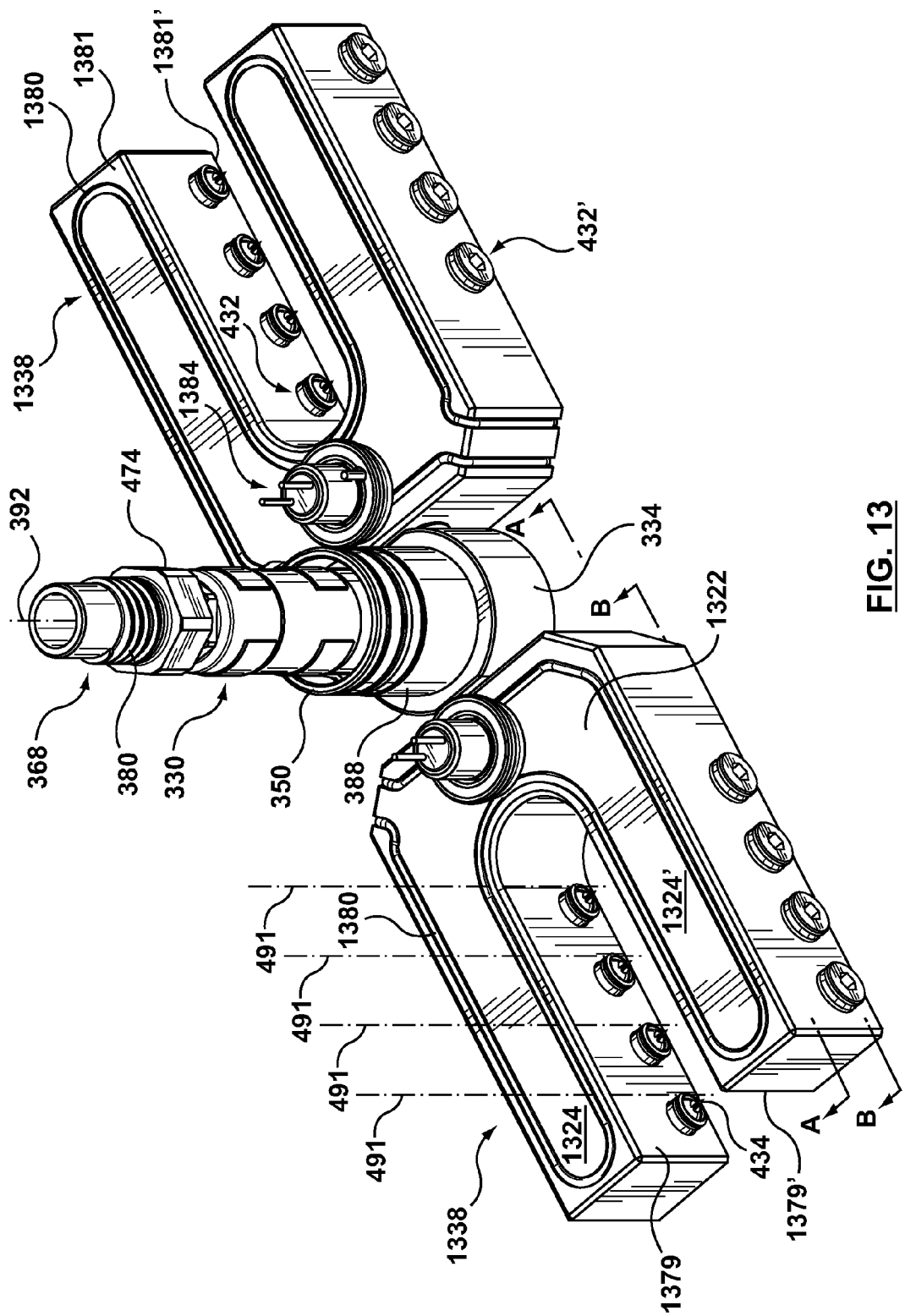
FIG. 13 is a perspective view of a downstream portion of an edge gated hot runner injection molding system in accordance with another embodiment hereof.
Figure 14:
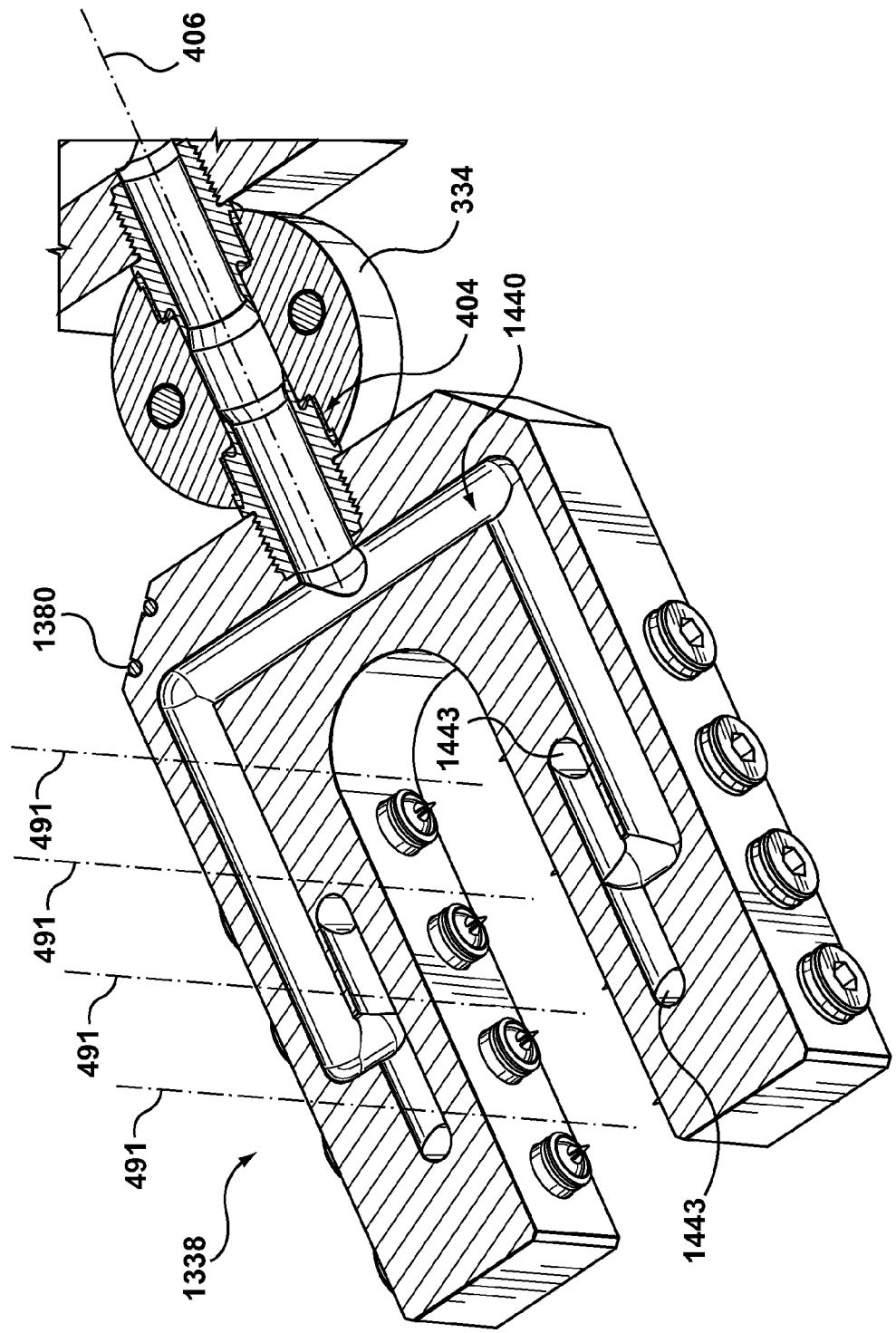
FIG. 14 is a sectional view taken along line A-A of FIG. 13.
Figure 15:
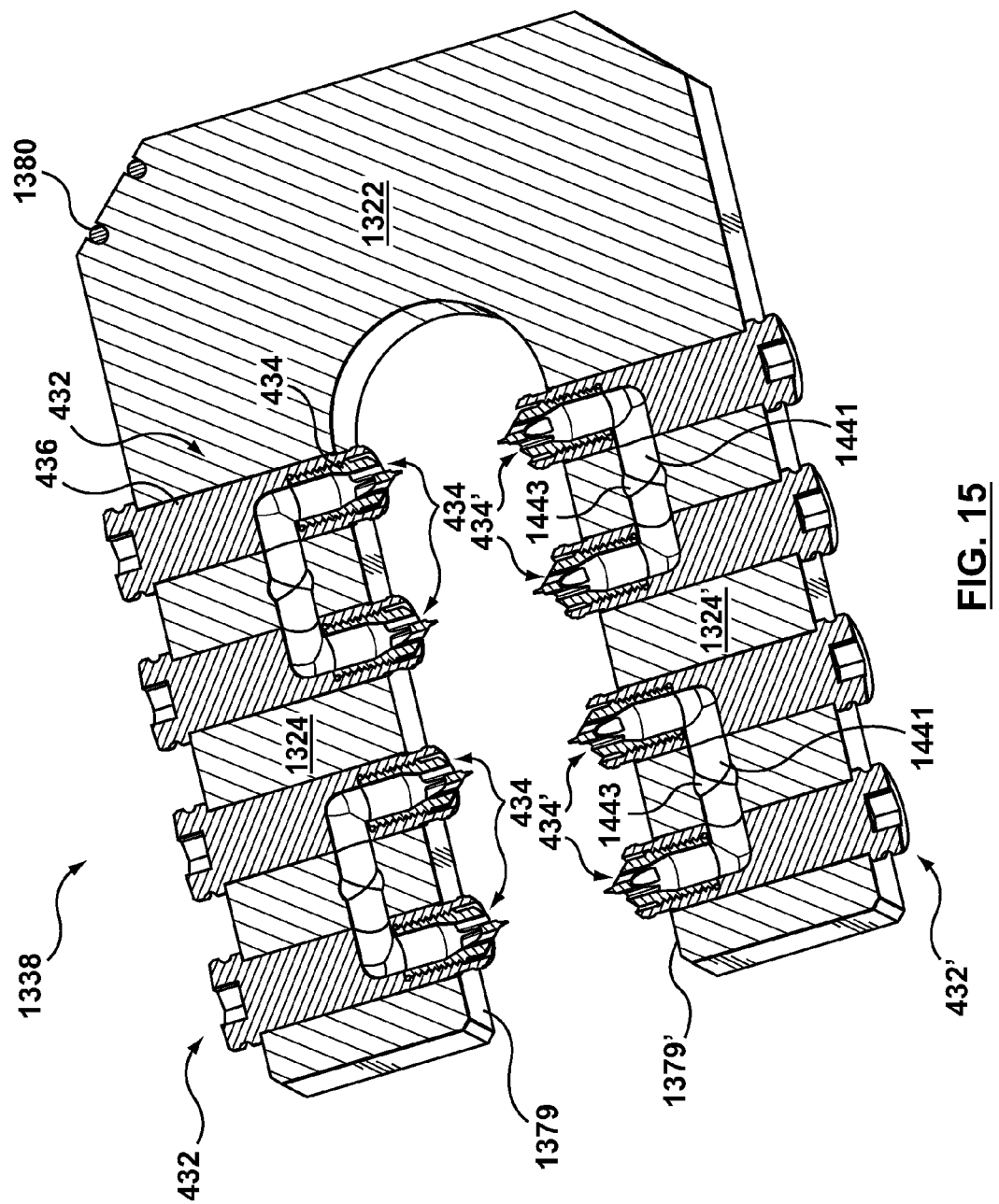
FIG. 15 is a sectional view taken along line B-B of FIG. 13.

FIG. 13 is a perspective view of a downstream portion of an edge gated hot runner injection molding system in accordance with another embodiment hereof, with FIG. 14 being a sectional view taken along line A-A of FIG. 13 and FIG. 15 being a sectional view taken along line B-B of FIG. 13. The embodiment of FIGS. 13-15 may be used with all features described above with reference to the previous embodiment and only features that differ therefrom are described in detail herein. In FIG. 13 downstream connector component 370 is shown attached to second nozzle portion 330 with a downstream end 388 of second nozzle portion 330 being coupled to melt diverter 334 in a manner as discussed above. Radially extending from and fluidly coupled to opposing sides of melt diverter 334 by respective telescopic connectors 404 are injection manifolds 1338. A heater component 1380 is embedded within upper and lower surfaces 1381, 1381' of each injection manifold 1338 with each end of a respective heater component 1380 being coupled to terminal component 1384.

Injection manifolds 1338 are substantially U-shaped having a base segment 1322 and first and second arm segments 1324, 1324' that extend therefrom. Each injection manifold 1338 includes a plurality of nozzle seals 432, 432' extending through respective first and second arm segments 1324, 1324' such that respective nozzle tips 434, 434' thereof protrude from opposing interior side walls 1379, 1379' of injection manifold 1338. More particularly, a pair of nozzle tips 434, 434' are disposed such that a first nozzle tip 434 protrudes from interior side wall 1379 to be aligned with a first nozzle tip 434' that protrudes from opposing interior side wall 1379' such that the pair of first nozzle tips 434, 434' feed a first mold cavity (not shown) from uniformly distributed mold gates (not shown), which in this embodiment would be diametrically opposing, as described with reference to the previous embodiment. In a similar manner, additional pair of nozzle tips 434, 434' are aligned to feed additional mold cavities positioned between first and second arm segments 1324, 1324'. More particularly, each of a second through fourth nozzle tip 434 is aligned with an opposing second through fourth nozzle tip 434' to feed a respective second through fourth mold cavity (not shown) from diametrically opposing mold gates (not shown) in a manner as similarly described with reference to the previous embodiment. Although four pair of opposing nozzle seals 432, 432' are shown in the embodiment of FIGS. 13-15, it would be understood by one of ordinary skill in the art that this is by way of illustration and not limitation such that more or fewer sets of opposing nozzle seals may be implemented without departing from the scope of the present invention. In addition, each of the mold cavities fed by a respective pair of nozzle seals 432, 432' has a longitudinal axis 491 that is substantially parallel to longitudinal axis 392 of second nozzle portion 330/nozzle 324.

In contrast to injection manifold 338 depicted and described with reference to FIG. 6, injection manifold 1338 has two levels of melt channels for receiving a melt stream of moldable material and delivering the melt stream in a balanced fashion to each of the mold cavities fed thereby. As shown in FIGS. 14 and 15, which are sectional views of injection manifold 1338, a first level melt channel 1440 receives the melt stream from melt distributor 334 and directs the melt stream to second level melt channels 1441 via a respective longitudinal connector melt channel 1443. In turn each second level melt channel 1441 feeds a pair of nozzle tips 434 or a pair of nozzle tips 434' to be directed to a respective mold cavity as discussed above with respect to the previous embodiment. The first level melt channels 1440 extend along a first plane and the second level melt channels 1441 extend along a second plane that is parallel to but longitudinally displaced from the first plane.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An injection molding system comprising:
   a melt delivery body having a melt channel extending along a longitudinal axis thereof for receiving a melt stream from a melt source;
   an injection manifold defining a melt channel in fluid communication with the melt channel of the melt delivery body and being disposed proximate a downstream end of the melt delivery body to radially extend therefrom relative to the longitudinal axis of the melt delivery body, the injection manifold melt channel including a first arm segment and a second arm segment extending from a base segment such that the first and second arm segments are disposed on opposing sides of a first mold cavity, the first mold cavity having a longitudinal axis that is parallel with the longitudinal axis of the melt delivery body; and a first pair of nozzle tips in fluid communication with the injection manifold melt channel for delivering the melt stream to the first mold cavity, wherein one of the first pair of nozzle tips is removably coupled to the first arm segment and the other of the first pair of nozzle tips is removably coupled to the second arm segment such that each of the first pair of nozzle tips extends toward the first mold cavity longitudinal axis to feed a respective one of a pair of mold gates on opposing sides of the first mold cavity.

2. The injection molding system of claim 1, wherein the longitudinal axis of the first mold cavity is transverse to a radial axis of the injection manifold.

3. The injection molding system of claim 2, wherein the radial axis of the injection manifold is transverse to the longitudinal axis of the melt delivery body.

4. The injection molding system of claim 1, wherein each of the pair of mold gates is uniformly distributed about the first mold cavity.

5. The injection molding system of claim 1, further comprising a second pair of nozzle tips and a second mold cavity disposed between the first and second arm segments of the injection manifold melt channel, wherein one of the second pair of nozzle tips is in fluid communication with the first arm segment of the injection manifold melt channel and the other of the second pair of nozzle tips is in fluid communication with the second arm segment of the injection manifold melt channel to deliver melt to opposing sides of the second mold cavity from a respective pair of mold gates.

6. The injection molding system of claim 1, wherein the melt delivery body is a hot runner injection molding nozzle in fluid communication at an upstream end with a hot runner injection manifold.

7. The injection molding system of claim 1, wherein the melt channel of the melt delivery body is fluidly coupled to the melt channel of the injection manifold via a melt diverter component.

8. The injection molding system of claim 7, wherein the injection manifold radially extends from a side of the melt diverter component and is fluidly coupled thereto via a telescopic connector.

9. The injection molding system of claim 8, wherein a radial axis of the injection manifold is transverse to a longitudinal axis of the melt diverter.

10. The injection molding system of claim 1, wherein each of the pair of mold gates is located adjacent a base of a mold core that defines an inner surface of the first mold cavity.

11. The injection molding system of claim 1, wherein a plurality of injection manifolds are in fluid communication with the melt delivery body with each injection manifold being disposed proximate the downstream end of the melt delivery body to radially extend therefrom relative to the longitudinal axis of the melt delivery body.

12. An injection manifold for receiving a melt stream of moldable material from an injection molding nozzle and delivering the melt stream to a mold cavity, comprising:

a body portion having first and second arm segments extending from a base segment such that the body portion is generally U-shaped, wherein the mold cavity is positioned between opposing interior walls of the first and second arm segments to longitudinally extend substantially transverse to the body portion; and a nozzle seal disposed through a bore in the first arm segment and a nozzle seal disposed through a bore in the second arm segment such that the pair of nozzle seals delivers the melt stream from the injection manifold to the mold cavity via a pair of mold gates.

13. The injection manifold of claim 12, wherein each of the pair of mold gates is located adjacent a base of a mold core that defines an inner surface of the mold cavity.

14. The injection manifold of claim 12, wherein the pair of mold gates is formed in a single gate insert.

15. The injection manifold of claim 12, wherein the nozzle seals included a nozzle tip that is threadably attached to a tip retainer.

16. The injection manifold of claim 12 further comprising:

a second nozzle seal disposed through a second bore in the first arm segment and a second nozzle seal disposed through a second bore in the second arm segment such that the second nozzle seals deliver the melt stream from the injection manifold to a second mold cavity via a respective pair of mold gates, wherein the second mold cavity is positioned between opposing interior walls of the first and second arm segments to longitudinally extend substantially transverse to the body portion.

17. The injection manifold of claim 16, wherein the body portion includes a first level of melt channels for receiving the melt stream from the injection molding nozzle and a second level of melt channels for delivering the melt stream to the nozzle seals, wherein the first level melt channels extend along a first plane and the second level melt channels extend along a second plane that is parallel to but displaced from the first plane.

18. An injection molding system comprising:

a melt delivery body having a delivery body melt channel extending along a central axis for receiving a supply of melt from a melt source;

at least one injection manifold extending outwardly from the melt delivery body along an axis that is transverse to the central axis, wherein the injection manifold includes an injection manifold melt channel in fluid communication with the delivery body melt channel, the injection manifold melt channel having a first arm and a second arm extending from a central portion;

a first nozzle tip in fluid communication with the first arm and extending towards the second arm; and a second nozzle tip in fluid communication with the second arm and extending towards the first arm.

19. The injection molding apparatus of claim 18, further comprising:

a third nozzle tip in fluid communication with the first arm and extending towards the second arm; and a fourth nozzle tip in fluid communication with the second arm and extending towards the first arm.

20. The injection molding apparatus of claim 18, further comprising a first mold cavity disposed between the first nozzle tip and the second nozzle tip such that melt flowing through the first nozzle tip and the second nozzle tip enter the first mold cavity from opposing sides of the mold cavity.

* * * * *